April 12, 1927.

D. VERSHBINSKY

EDUCATIONAL APPLIANCE

Filed June 7, 1926

1,624,450

| FRENCH SURRENDERED QUEBEC TO ENGLAND | WHEN DID HENRY HUDSON DISCOVER THE HUDSON RIVER? | WHEN DID PILGRIMS SETTLE IN PLYMOUTH. | HISTORY DIRECTIONS |
|---|---|---|---|
| 1759 | 1609 | 1620 | PUSH OUT ALL PLUGS AND INTERMIX THEM. TRY TO FIND THE ONE WHICH WILL FIT IN THE OPENING OF THE PROBLEM YOU DESIRE TO SOLVE. THE ANSWER IS ON THE CORRESPONDING PLUG. |
| BATTLE OF LONG ISLAND | DUTCH SETTLEMENT AT NEW AMSTERDAM | THE FIRST PERMANENT SETTLEMENT IN U.S.A. | NO OTHER PLUG WILL FIT THE OPENING BUT THE ONE WITH THE CORRECT ANSWER. |
| 1776 | 1623 | 1607 AT JAMESTOWN | PASS PROBLEM CARDS TO VARIOUS PLAYERS. THE PLAYER FIRST FILLING HIS CARD WINS THE GAME. |
| SPANISH ARMADA DEFEATED BY THE ENGLISH | DECLARATION OF INDEPENDENCE | SIGNING OF TREATY OF PEACE BETWEEN U.S.A. AND GREAT BRITAIN. | COLUMBUS DISCOVERED AMERICA |
| 1588 | 1776 | 1783 | |

1492

Fig. 1

| 2x5 | 4x5 | 7x5 | MULTIPLICATION |
|---|---|---|---|
| 5x2 / 10 | 5x4 / 20 | 5x7 / 35 | DIRECTIONS |
| 3x5 | 8x5 | 6x5 | |
| 5x3 / 15 | 5x8 / 40 | 5x6 / 30 | |
| 9x5 | 5x5 | 1x5 | 10x5 |
| 5x9 / 45 | 25 | 5x1 / 5 | 5x10 |

50

Fig. 2

INVENTOR.
DAVID VERSHBINSKY
BY
ATTORNEY.

Patented Apr. 12, 1927.

1,624,450

UNITED STATES PATENT OFFICE.

DAVID VERSHBINSKY, OF BROOKLYN, NEW YORK.

EDUCATIONAL APPLIANCE.

Application filed June 7, 1926. Serial No. 114,146.

This invention relates to educational appliances, more particularly to means for teaching children and other persons.

It is among the objects of this invention to devise means for imparting knowledge to various individuals and to aid them in memorizing the answers to problems which they may meet in their study, such as problems in arithmetic, history, natural history, botany and the like.

It is also among the objects of this invention to provide a device which shall introduce the element of competition in the memorizing of facts being studied, so that the pupil will be able to learn without effort and will be entertained during his study.

In practicing my invention I provide a sheet, which may be of cardboard, wood or other material and form therein a series of openings of approximately the same shape but of somewhat different size, so that upon superficial examination the openings and the pieces fitting into the same, which may be formed by the punching of the openings in the sheet, appear to be alike. Preferably, lines are drawn on the sheet setting off each opening and within the spaces so provided are placed suitable data, such as questions in botany or the like. The corresponding data, such as the answers to the question, are placed on the piece which fits into the proper opening.

In using the device all the pieces are removed from the openings and they are shuffled to mix them. Since superficially all or most of the openings and pieces appear alike, it becomes difficult to guess which piece fits into any opening. The fitting together of the parts may be accomplished by trial or by remembering the answer to the problem or question adjacent to any openings, and since the corresponding piece contains the answer it may be readily fitted into place. In case the answer is not known to the person using the device he first solves the problems by trial, fitting the pieces into the openings. After a few such trials he will memorize the answer to the problems and will thus be taught the lessons on the sheet.

The person to be taught may use the device alone and he will check his play himself by being forced to place the correct answer in the proper opening, but the device may be used by several in the school, for example. The teacher may distribute the sheets and the pieces and require the students to assemble the same. Preferably, the element of competition is brought in by having a race among the pupils to see which will complete the sheet first.

In the accompanying drawing constituting a part hereof and in which like reference characters indicate like parts:

Fig. 1 is a plan view of a sheet made in accordance with my invention, one of the pieces being removed from the sheet, and Fig. 2 is a similar view of a slightly modified form of my invention.

The rectangular sheet 1 is ruled with lines 2 and 3 at right angels providing a series of spaces 4. Each of said spaces is formed with an opening 5 and has a piece 6 fitting therein. The openings may be made by a suitable die and the portions thus cut out form the corresponding piece 6. All of the openings in sheet 1 are rectanguar and differ somewhat in size so that at first glance or to the unpracticed eye, they appear alike. In each of the spaces 4 is datum 7 consisting of a question in history. On each of the pieces 6 is the answer 8 to the question. At one side of the sheet is a set of instructions 9 for operating the invention.

All the pieces 6 are removed from the openings 5 and are thoroughly mixed. The person then fits them into the proper openings, first by trial, and then by remembering the answers 8 to the questions 7. At this stage he has learned the lesson and he can rapidly replace the pieces. The element of competition, as explained above, speeds up the process of memorizing the answers.

Referring to Fig. 2, the sheet 10 is divided into spaces 4 by lines 2 and 3, but I provide circular openings 11 and corresponding circular pieces 12 fitting into the same. The problems 13 are problems in multiplication, the answers 14 being placed on the pieces 12. A set of instructions 15 is given on the side of the sheet.

Although I have described my invention setting forth two specific examples of the operation thereof, it is not limited thereto as many changes may be made in the practical embodiment thereof without departing from the principles set forth. For instance, the data may be placed on both sides of the sheet and the two sides may be distinguished by different colors of the surfaces or of the lettering or both. It is to be understood that the sciences mentioned are not the only ones that may be taught by my device;

the teaching of anatomy, literature and many other subjects being contemplated by this invention. The shape of the openings need not be circular or rectangular, as many other regular or irregular shapes may be used, such as triangles, hexagons, rhomboids and the like may be used, it being necessary only that the pieces appear alike at a casual inspection. These and other changes may be made in my invention, the scope of which is set forth in the claims appended hereto.

I claim—

1. An educational appliance comprising a sheet, a plurality of openings therein of approximately the same shape and of different size, pieces fitting into said openings, and data on said sheet and pieces, the size of said openings and pieces being so slightly different as not to be readily distinguishable.

2. An educational appliance comprising a sheet, a plurality of openings therein of approximately the same shape and of different size, and pieces fitting into said openings, data on said sheet adjacent to said openings and corresponding data on the pieces fitting into said openings.

3. An educational appliance comprising a sheet, a plurality of openings therein of approximately the same shape and of different size, and pieces fitting into said openings, problems on said sheet adjacent to said openings and corresponding answers on the pieces fitting into said openings.

4. An educational appliance comprising a sheet, a plurality of openings therein of approximately the same shape and of different size, pieces fitting into said openings, and data on said sheet and pieces, each piece fitting only into its proper opening.

5. An educational appliance comprising a sheet, a plurality of openings therein of approximately the same shape and of different size, pieces fitting into said openings, data on both sides of said sheet adjacent to said openings and corresponding data on the pieces fitting into said openings.

6. An educational appliance comprising a sheet, a plurality of openings therein of rectangular shape and of different size, pieces fitting into said openings, and data on said sheet and pieces.

7. An educational appliance comprising a sheet, lines thereon providing a plurality of spaces, an opening in each of said spaces, said openings being of approximately the same shape and of different size, pieces fitting into said openings, and data on said sheet and pieces.

8. An educational appliance comprising a sheet, lines thereon providing a plurality of spaces, an opening in each of said spaces, said openings being of slightly different size, pieces fitting into said openings, and data on said sheet and pieces.

9. An educational appliance comprising a sheet, lines thereon providing a plurality of spaces, an opening in each of said spaces, said openings being of slightly different size, and pieces fitting into said openings, data in each of said spaces and corresponding data on the pieces fitting into the openings therein.

10. An educational appliance comprising a sheet, a plurality of openings therein of approximately the same shape and of different size, pieces fitting into said openings, and data on said sheet and pieces, each of said pieces being adapted to fit in only one of the openings in said sheet.

In testimony whereof, I have hereunto subscribed my name this 5th day of June, 1926.

DAVID VERSHBINSKY.